(12) United States Patent
Hisada

(10) Patent No.: US 11,148,724 B2
(45) Date of Patent: Oct. 19, 2021

(54) VEHICLE BODY SIDE STRUCTURE

(71) Applicant: Toyota Jidosha Kabushiki Kaisha, Toyota (JP)

(72) Inventor: Kohei Hisada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 29 days.

(21) Appl. No.: 16/837,173

(22) Filed: Apr. 1, 2020

(65) Prior Publication Data

US 2020/0317271 A1 Oct. 8, 2020

(30) Foreign Application Priority Data

Apr. 3, 2019 (JP) .............................. JP2019-071353

(51) Int. Cl.
B62D 25/20 (2006.01)
B62D 25/04 (2006.01)
B62D 21/15 (2006.01)
B62D 25/02 (2006.01)
B62D 27/02 (2006.01)

(52) U.S. Cl.
CPC ........... B62D 25/025 (2013.01); B62D 25/04 (2013.01); B62D 27/02 (2013.01)

(58) Field of Classification Search
CPC .... B62D 25/04; B62D 25/025; B62D 27/023; B62D 21/157

USPC ................................ 296/209, 193.06, 187.12
See application file for complete search history.

(56) References Cited

U.S. PATENT DOCUMENTS

| 5,984,402 A | 11/1999 | Takeuchi | |
|---|---|---|---|
| 10,232,891 B2 * | 3/2019 | Yoshida | ............. B62D 25/2036 |
| 2010/0133877 A1 * | 6/2010 | Mori | ..................... B23K 26/24 |
| | | | 296/187.12 |

FOREIGN PATENT DOCUMENTS

| JP | H09254729 A | 9/1997 |
|---|---|---|
| JP | H11059497 A | 3/1999 |

* cited by examiner

*Primary Examiner* — Dennis H Pedder
(74) *Attorney, Agent, or Firm* — Dinsmore & Shohl LLP

(57) ABSTRACT

An outer panel of a vehicle body side structure includes a first region overlapping a lower end portion of the pillar, and a second region adjacent to a first region on a front side and a rear side. An inner panel includes: a third region having a part facing the first region in a vehicle width direction; and a fourth region adjacent to the third region on the front side and the rear side. The second region is set to be a first-strength region having a higher strength than the first region. The third region is set to be a second-strength region having a higher strength than the fourth region. The second region and the third region are connected to each other.

9 Claims, 7 Drawing Sheets

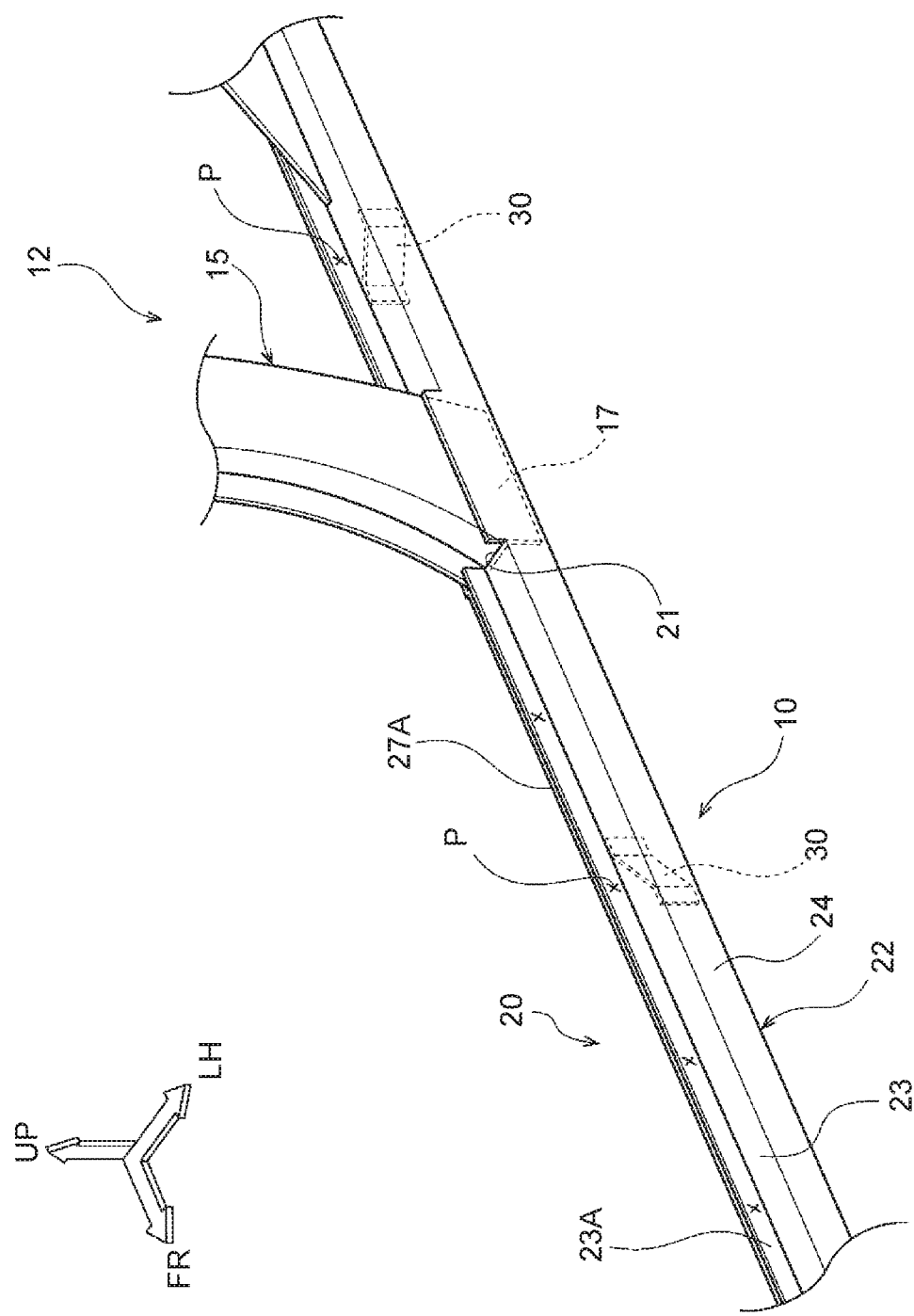

VEHICLE BODY SIDE STRUCTURE

CROSS-REFERENCE TO RELATED APPLICATIONS

This application claims priority to Japanese Patent Application No. 2019-071353 filed on Apr. 3, 2019, which is incorporated herein by reference in its entirety including the specification, drawings and abstract.

BACKGROUND

1. Technical Field

The present disclosure relates to a vehicle body side structure.

2. Description of Related Art

There has been conventionally known such a vehicle body side structure that a side sill (rocker) at a lower part of a center pillar is provided with a partition wall that divides a cross section of the side sill in the vehicle width direction, the lower part of the center pillar is joined to an outer surface of this partition wall, and a side sill inner formed to be fragile is joined to an inner surface of the partition wall, and an end of a center cross member provided to the lower part of the center pillar is joined to the side sill inner so as to form a fragile part of the side sill (see for example, Japanese Patent Application Publication No. 11-59497).

SUMMARY

Unfortunately, if the inner surface of the side sill is made more fragile than the outer surface thereof, and a collision load input from the outer side in the vehicle width direction at a time of a side collision of the vehicle (particularly, a pole side collision causing a large deformation) is received on a compression deformation side that is located on the outer surface side of the side sill, the energy absorption efficiency of the side sill is locally lowered, which may affect other parts of the side sill that are not expected to be deformed. Thus, there is still room for improvement in a collision safety performance at the time of the side collision of the vehicle.

The present disclosure provides a vehicle body side structure capable of enhancing the energy absorption efficiency of a rocker with respect to a collision load input from the outer side in the vehicle width direction and promoting enhancement of the collision safety performance at the time of the side collision of the vehicle.

A vehicle body side structure according to an aspect of the present disclosure includes: a rocker formed in a closed cross-sectional shape by joining an outer panel disposed outward in a vehicle width direction and extending in a front-rear direction of a vehicle body, and an inner panel disposed inward in the vehicle width direction and extending in the front-rear direction of the vehicle body; and a pillar having a lower end portion joined to the rocker. The outer panel includes a first region overlapping with the lower end portion of the pillar in a side view as viewed from the vehicle width direction, and a second region adjacent to the first region on a front side of the vehicle body and on a rear side of the vehicle body, the inner panel includes a third region including a part facing the first region in the vehicle width direction, and a fourth region adjacent to the third region on the front side of the vehicle body and on the rear side of the vehicle body, the second region is set to be a first-strength region having a higher strength than a strength of the first region, and the third region is set to be a second-strength region having a higher strength than a strength of the fourth region, and the second region and the third region are connected to each other.

According to the vehicle body side structure of the first aspect, the second region and the third region, both of which are set to be high-strength regions, are connected to each other. Therefore, a collision load input into the rocker from the outer side in the vehicle width direction is transmitted to the second region and the third region that have a high strength and located on the tensile deformation side. Hence, the energy absorption efficiency of the rocker with respect to the collision load input from the outer side in the vehicle width direction is increased. Therefore, the collision safety performance at the time of the side collision of the vehicle is enhanced.

The third region may be longer in the front-rear direction of the vehicle body than the first region.

In this structure, compared with a structure in which the third region is shorter than the first region in the front-rear direction of the vehicle body, a collision load input into the rocker from the outer side in the vehicle width direction is more smoothly transmitted to the second region and the third region. Accordingly, the energy absorption efficiency of the rocker with respect to the collision load input from the outer side in the vehicle width direction is further enhanced.

In the side view as viewed from the vehicle width direction, a front part and a rear part of the third region may overlap respectively with the second region in the front-rear direction of the vehicle body.

According to this structure, compared with a structure in which the third region does not overlap with the second region in the front-rear direction of the vehicle body and a structure in which only the front part or the rear part of the third region overlaps with the second region in the front-rear direction of the vehicle body, the high-strength region is not discontinued in the front-rear direction of the vehicle body, and the region on the tensile deformation side that transmits the collision load input into the rocker from the outer side in the vehicle width direction is smoothly formed.

The vehicle body side structure may further include a connecting member connecting the second region and the third region, the connecting member having an inclined wall inclining with respect to the front-rear direction of the vehicle body, in a plan view as viewed from above the vehicle body.

In this structure, the collision load input into the rocker from the outer side in the vehicle width direction is transmitted to the second region, the third region, and the connecting member. Accordingly, the energy absorption efficiency of the rocker with respect to the collision load input from the outer side in the vehicle width direction is further increased.

The vehicle body side structure may further include a connecting member connecting the second region and the third region, the connecting member having an inclined wall inclining with respect to the front-rear direction of the vehicle body in a plan view as viewed from above the vehicle body, and at least a part of the connecting member may be disposed in a region where the second region and the third region overlap with each other.

In this structure, the collision load input into the rocker from the outer side in the vehicle width direction is transmitted to the second region, the third region, and the connecting member. Accordingly, the energy absorption efficiency of the rocker with respect to the collision load input from the outer side in the vehicle width direction is further enhanced. At least a part of the connecting member is arranged in the region where the second region and the third region overlap with each other. Therefore, the connecting member prevents the region where the second region and the third region overlap with each other from being broken and discontinued by the collision load input into the rocker from the outer side in the vehicle width direction. Accordingly, the collision load input into the rocker from the outer side in the vehicle width direction is efficiently transmitted to the second region and the third region.

A height of the connecting member may be the same as a height of each of side walls of the outer panel and the inner panel.

In this structure, compared with a structure in which the height of the connecting member is lower than the height of each of the side walls of the outer panel and the inner panel, the region located on the tensile deformation side that transmits the collision load input into the rocker from the outer side in the vehicle width direction is effectively formed by using the entire height of each the side walls of the outer panel and the inner panel. Accordingly, the collision load is efficiently transmitted from the side wall of the outer panel to the side wall of the inner panel.

A plate thickness of the fourth region may be thinner than a plate thickness of the third region.

In this structure, in the rocker, the fourth region where the collision load is not directly transmitted is implemented with a simple configuration having the reduced plate thickness, and also attains the weight reduction. Therefore, the weight reduction is attained while enhancement of the energy absorption efficiency of the rocker with respect to the collision load input from the outer side in the vehicle width direction is promoted.

A plate thickness of the first region may be thinner than a plate thickness of the second region.

In this structure, the plate thickness of the first region is thinner than the plate thickness of the second region. Therefore, in the rocker, the first region on the compression deformation side is implemented with a simple configuration having the reduced plate thickness, and also attains the weight reduction. Accordingly, the weight reduction of the vehicle is attained while enhancement of the energy absorption efficiency of the rocker with respect to the collision load input from the outer side in the vehicle width direction is promoted.

A strength of the third region may be equal to or more than a strength of the second region.

In this structure, the collision load input into the rocker from the outer side in the vehicle width direction is efficiently absorbed by the third region. Therefore, the energy absorption efficiency of the rocker with respect to the collision load input from the outer side of the vehicle width direction is further enhanced.

As described above, according to the present disclosure, it is possible to enhance the energy absorption efficiency of the rocker with respect to the collision load input from the outer side in the vehicle width direction, and also promote enhancement of the collision safety performance at the time of the side collision of the vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 7 is an enlarged perspective view showing a rocker configuring a vehicle body side structure according to a third embodiment.

DETAILED DESCRIPTION OF EMBODIMENTS

Hereinafter, embodiments of the present disclosure will be described in detail with reference to the drawings. For convenience of explanation, as appropriately shown in each drawing, an arrow UP indicates an upward direction of a vehicle body, an arrow FR indicates a frontward direction of the vehicle body, and an arrow LH indicates a leftward direction of the vehicle body. In addition, in the following description, when up-down, front-rear, and left-right directions are described unless otherwise mentioned, they respectively denote up and down in the height direction of the vehicle body, front and rear in the front-rear direction of the vehicle body, and left and right in the left-right direction (vehicle width direction) of the vehicle body.

First Embodiment

Figure 1:
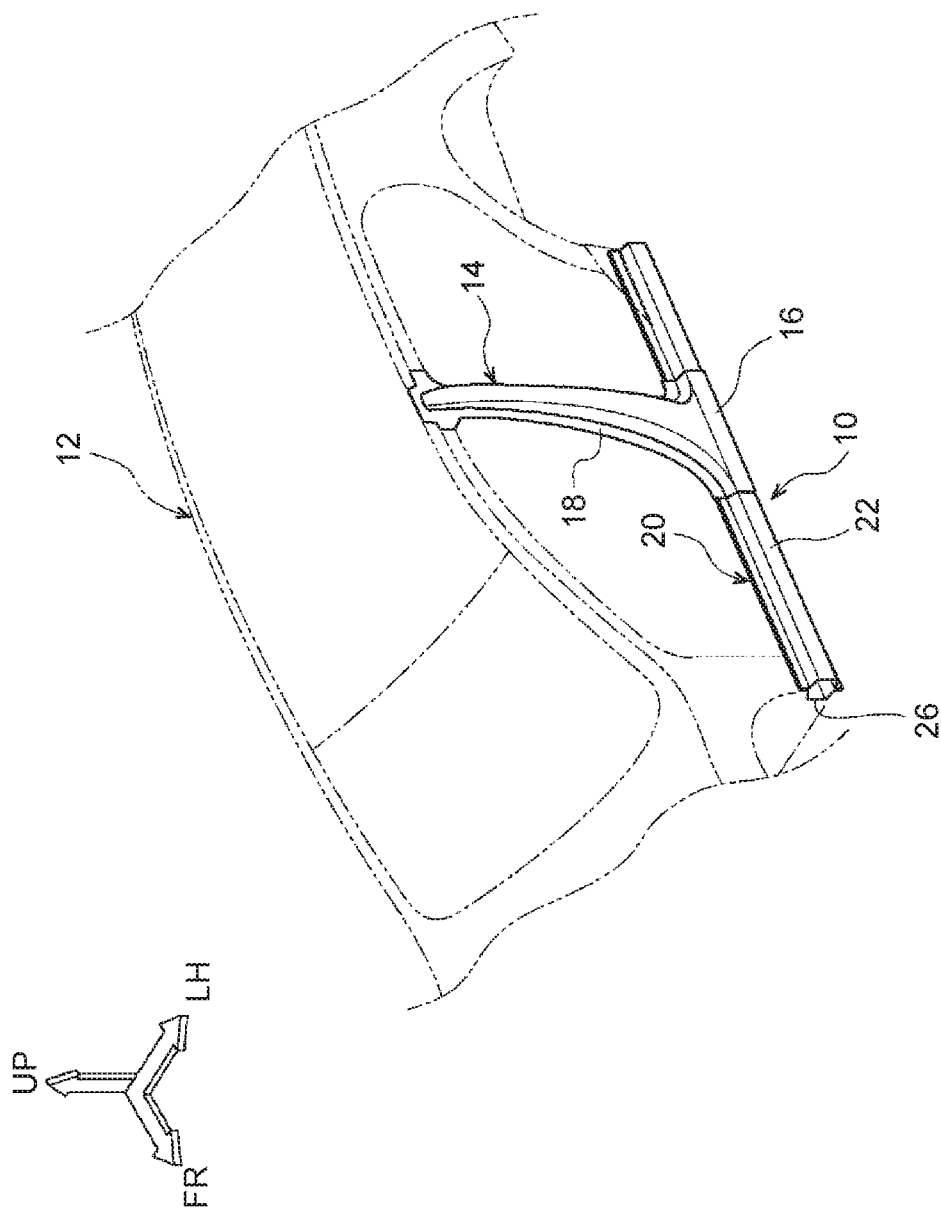
FIG. 1 is a perspective view showing a skeleton of a vehicle including a rocker that configures a vehicle body side structure according to a first embodiment.

First, the first embodiment will be described. As shown in FIG. 1, a rocker (also referred to as a side sill) 20 of a vehicle 12 including a vehicle body side structure 10 according to the first embodiment is formed in a substantially rectangular closed cross-sectional shape by joining an outer panel 22 extending in the vehicle front-rear direction and an inner panel 26 extending in the vehicle front-rear direction.

Figure 2:
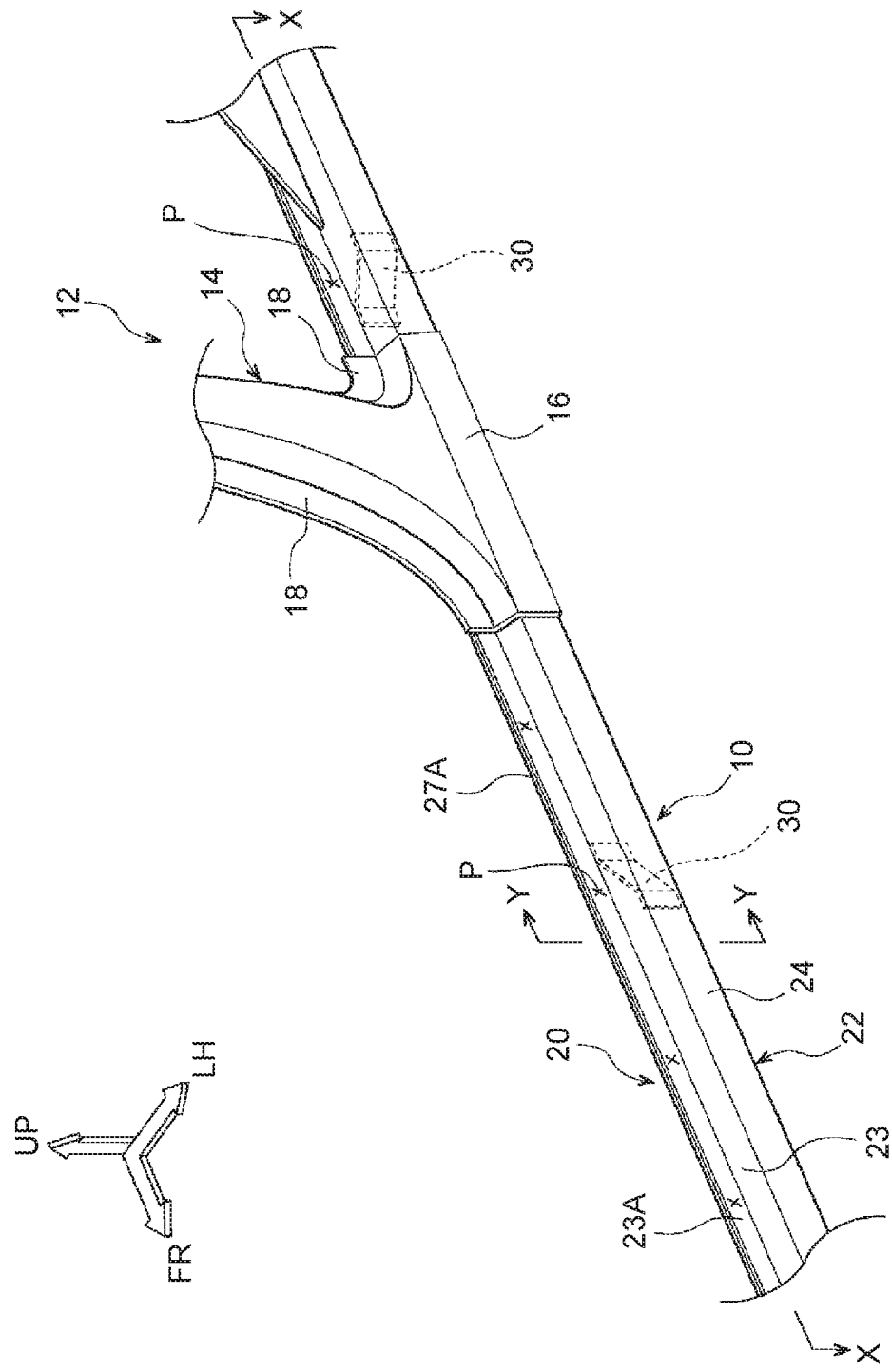
FIG. 2 is an enlarged perspective view showing the rocker configuring the vehicle body side structure according to the first embodiment.
Figure 4:
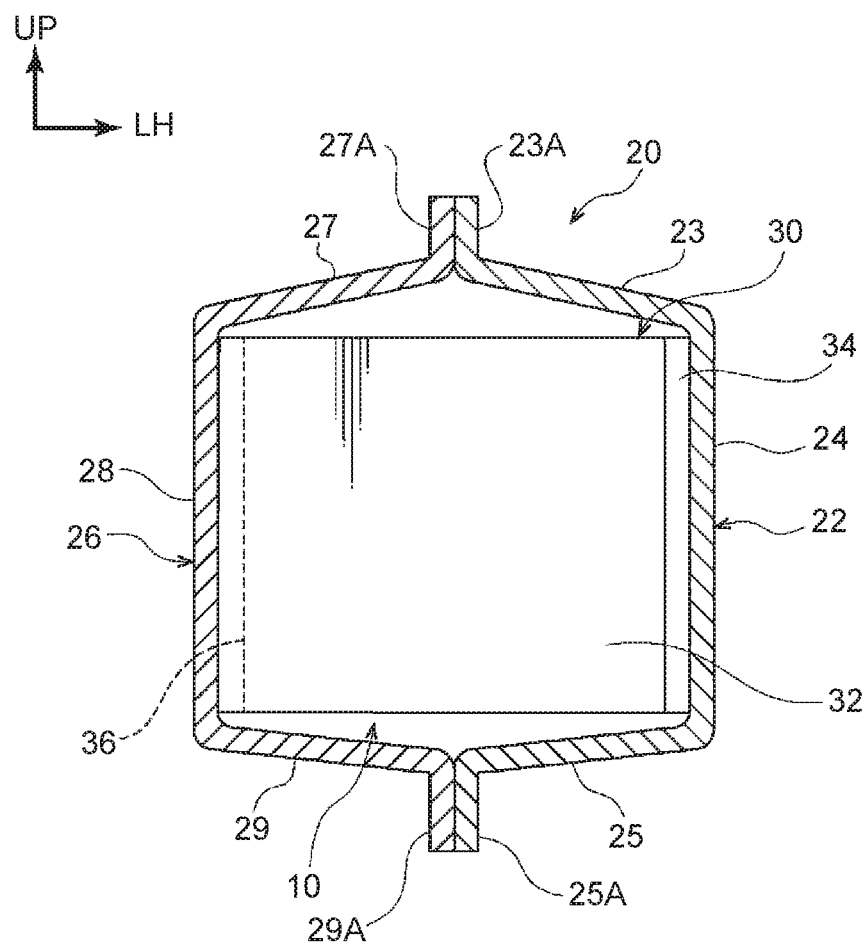
FIG. 4 is a front sectional view taken along line Y-Y of FIG. 2, showing the rocker configuring the vehicle body side structure according to the first embodiment.

More specifically, as shown in FIG. 2, FIG. 4, the outer panel 22 disposed outward in the vehicle width direction and the inner panel 26 disposed inward in the vehicle width direction are each formed in a substantially hat-like shape, as viewed from the front-rear direction of the vehicle body, in such a manner that upper flange portions 23A, 27A described later can be laid on each other, and lower flange portions 25A, 29A described later can be laid on each other.

That is, the outer panel 22 includes: a side wall 24 disposed on the outer side in the vehicle width direction; an upper wall 23 and a lower wall 25 that are integrally formed to be continuous from an upper end portion and a lower end portion of the side wall 24; and an upper flange portion 23A and a lower flange portion 25A that are integrally formed to be continuous from the upper wall 23 and the lower wall 25.

Similarly, the inner panel 26 includes: a side wall 28 disposed on the inner side in the vehicle width direction; an upper wall 27 and a lower wall 29 that are integrally formed to be continuous from an upper end portion and a lower end portion of the side wall 28, and an upper flange portion 27A and a lower flange portion 29A that are integrally formed to be continuous from the upper wall 27 and the lower wall 29.

Then, the upper flange portion 23A of the outer panel 22 and the upper flange portion 27A of the inner panel 26 that overlap with each other are joined by joining methods such as spot welding at predetermined intervals along the front-rear direction of the vehicle body; and the lower flange portion 25A of the outer panel 22 and the lower flange portion 29A of the inner panel 26 that overlap with each other are joined by joining methods such as spot welding at predetermined intervals along the front-rear direction of the vehicle body.

Further, a lower end portion of a center pillar (hereinafter, referred to as a "B pillar") 14 as an example of a pillar is joined to a substantially middle portion of the outer panel 22 configuring the rocker 20 by joining methods such as spot welding. More specifically, the lower end portion of the B pillar 14 is formed in a substantially inverted "T" shape in a side view as viewed from the vehicle width direction, and also formed to be a joint part 16 having a substantially inverted "L" shaped cross section.

The joint part 16 is overlaid on the upper wall 23 and the side wall 24 of the outer panel 22 from the outer side in the vehicle width direction, and is joined thereto by joining methods such as spot welding. A flange portion 18 is formed at each of the front end portion and the rear end portion of the B pillar 14, and the lower end portion of the flange portion 18 along the joint part 16 is disposed to overlap with the upper flange portion 23A of the outer panel 22 from the outer side in the vehicle width direction.

Figure 3:
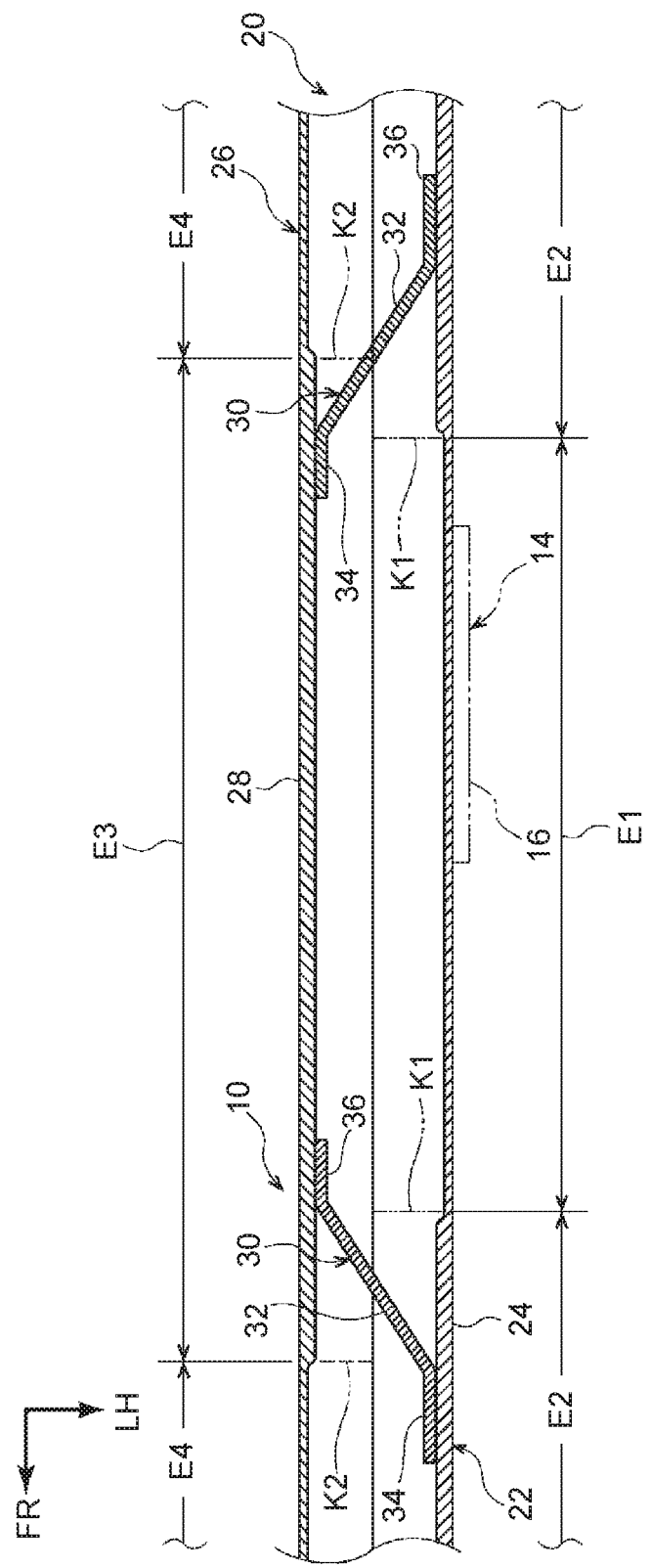
FIG. 3 is a plan sectional view taken along line X-X of FIG. 2, showing the rocker configuring the vehicle body side structure according to the first embodiment.

As shown in FIG. 3, the outer panel 22 (the side wall 24, the upper wall 23, the upper flange portion 23A, the lower wall 25, and the lower flange portion 25A) includes: a first region E1 having a predetermined length ranging across the entire region on which the joint part 16 that is the lower end portion of the B pillar 14 is overlaid; and a second region E2 located adjacent to the first region E1 on the front side and on the rear side of the vehicle body.

The inner panel 26 (the side wall 28, the upper wall 27, the upper flange portion 27A, the lower wall 29, and the lower flange portion 29A) has a third region E3 having a predetermined length including a part facing the first region E1 in the vehicle width direction (longer than the first region E1 as described later); and a fourth region E4 located adjacent to the third region E3 on the front side and on the rear side of the vehicle body.

In FIG. 3, a boundary line between the first region E1 and the second region E2 is indicated by an imaginary line K1, and a boundary line between the third region E3 and the fourth region E4 is indicated by an imaginary line K2. In addition, the second region E2 is set to be a high-strength region having a higher strength than that in the first region E1, and the third region E3 is set to be a high-strength region having a higher strength than that in the fourth region E4.

More specifically, the plate thickness of the outer panel 22 located in the second region E2 is thicker than a plate thickness of the outer panel 22 located in the first region E1, and the plate thickness of the inner panel 26 located in the third region E3 is thicker than a plate thickness of the inner panel 26 located in the fourth region E4.

In other words, the plate thickness of the outer panel 22 located in the first region E1 is thinner than the plate thickness of the outer panel 22 located in the second region E2, and the plate thickness of the inner panel 26 located in the fourth region E4 is thinner than the plate thickness of the inner panel 26 located in the third region E3.

As a method for changing the plate thicknesses of the outer panel 22 and the inner panel 26, it is conceivable to use a known tailor welded blank (TWB) or a known tailor rolled blank (TRB). In the present embodiment, a TRB is used as an example.

In the present embodiment, the plate thickness of the outer panel 22 located in the first region E1 and the plate thickness of the inner panel 26 located in the fourth region E4 are set to be the same (for example, 1.0 mm), and the plate thickness of the outer panel 22 located in the second region E2 and the plate thickness of the inner panel 26 located in the third region E3 are set to be the same (for example, 1.4 mm). That is, the second region E2 and the third region E3 are configured to be the same high-strength region, and the first region E1 and the fourth region E4 are configured to be the same low-strength region.

However, the first region E1 to the fourth region E4 are not limited to this configuration. For example, the third region E3 may be configured to have a strength equal to or more than that in the second region E2. That is, the third region E3 may be configured to be a high-strength region having a strength equal to or more than that in the second region E2. Conversely, the second region E2 may be configured to have a strength equal to or more than that in the third region E3. That is, the second region E2 may be configured to be a high-strength region having a strength equal to or more than that in the third region E3.

Furthermore, for example, the fourth region E4 may be configured to have a strength equal to or less than that in the first region E1. That is, the fourth region E4 may be configured to be a low-strength region having a strength equal to or less than that in the first region E1. Conversely, the first region E1 may be configured to have a strength equal to or less than that in the fourth region E4. That is, the first region E1 may be configured to be a low-strength region having a strength equal to or less than that in the fourth region E4.

As shown in FIG. 3, the second region E2 and the third region E3 are connected by connecting members 30 each having an inclined wall 32 that inclines with respect to the vehicle front-rear direction (or vehicle width direction) in a plan view. More specifically, each connecting member 30 includes: the inclined wall 32 having a flat and rectangular shaped perpendicular surface facing a direction (horizontal direction) orthogonal to the vertical direction; a front flange portion 34 integrally extending from the front end portion of the inclined wall 32 in the frontward direction of the vehicle body; and a rear flange portion 36 integrally extending from the rear end portion of the inclined wall 32 in the rearward direction of the vehicle body.

As shown in FIG. 3, in the connecting member 30 provided to the rocker 20 located anterior to the B pillar 14 (joint part 16) in the vehicle body, the front flange portion 34 is joined to an inner surface in the closed cross-section of the side wall 24 of the outer panel 22 in the second region E2 by joining methods such as spot welding, and the rear flange portion 36 is joined to an inner surface in the closed cross-section of the side wall 28 of the inner panel 26 in the third region E3 by joining methods such as spot welding.

On the other hand, in the connecting member 30 provided to the rocker 20 located posterior to the B pillar 14 (joint part 16) in the vehicle body, the front flange portion 34 is joined to an inner surface in the closed cross-section of the side wall 28 of the inner panel 26 in the third region E3 by joining methods such as spot welding, and the rear flange portion 36 is joined to an inner surface in the closed cross-section of the side wall 24 of the outer panel 22 in the second region E2 by joining methods such as spot welding.

As shown in FIG. 4, the height (width along the height direction) of the connecting member 30 including the inclined wall 32, the front flange portion 34, and the rear flange portion 36 has the same height as the heights of the side wall 24 of the outer panel 22 and the side wall 28 of the inner panel 26. The "heights of the side walls 24, 28" referred to here are heights excluding portions having curvatures at a boundary between the respective upper walls 23 and 27 of the side walls 24, 28 and at a boundary between the respective lower walls 25 and 29 of the side walls 24, 28; and the term "the same" includes substantially the same including variations of the components.

As shown in FIG. 3, the length of the third region E3 along the front-rear direction of the vehicle body is longer than the length of the first region E1 along the front-rear direction of the vehicle body. More specifically, the front part and the rear part of the third region E3 overlap with (are overlaid on) the second region E2 on the front side and the second region E2 on the rear side, respectively in the front-rear direction of the vehicle body, in a side view as viewed in the vehicle width direction.

However, the length on the front side and the length on the rear side of the third region E3 that overlap respectively with the second region E2 on the front side and the second region E2 on the rear side are different from each other. That is, the length of the front part of the third region E3 that overlaps with the second region E2 on the front side is set to be longer than the length of the rear part of the third region E3 that overlaps with the second region E2 on the rear side. This is because the length of the rocker 20 on the front side of the vehicle body from the B pillar 14 (joint part 16) is set to be longer than the length of the rocker 20 on the rear side of the vehicle body from the B pillar 14 (joint part 16).

More specifically, this is because a ratio of the length of the front part of the third region E3 overlapping with the second region E2 on the front side relative to the length of the rocker 20 on the front side of the vehicle body from the B pillar 14 (joint part 16) and a ratio of the length of the rear part of the third region E3 overlapping with the second region E2 on the rear side relative to the length of the rocker 20 on the rear side of the vehicle body from the B pillar 14 (joint part 16) are configured to be substantially the same.

Further, as shown in FIG. 2, it is configured that at least the upper flange portion 23A and the upper flange portion 27A that are located in the above-described overlapping region are joined to each other by joining methods such as spot welding. It is also configured that at least the lower flange portion 25A and the lower flange portion 29A that are located in the above-described overlapping region are joined to each other by joining methods such as spot welding.

That is, it is configured that the upper flange portion 23A and the upper flange portion 27A in the mutual overlapping region are provided with at least one spot-welded portion P, and the lower flange portion 25A and the lower flange portion 29A in the mutual overlapping region are provided with at least one spot weld (not shown). Further, it is configured that at least a part of the connecting member 30 (inclined wall 32) is arranged in the above-described overlapping region (see FIG. 3).

Next, operation of the above-configured vehicle body side structure 10 according to the first embodiment will be described.

A "side collision" in the present embodiment includes: an SUV (sport utility vehicle) side collision in which a collision load is input into the rocker 20 through the B pillar 14 due to a side collision of an SUV; and a pole side collision in which a collision load is directly input into the rocker 20 as a pole has a relative collision.

Figure 5:
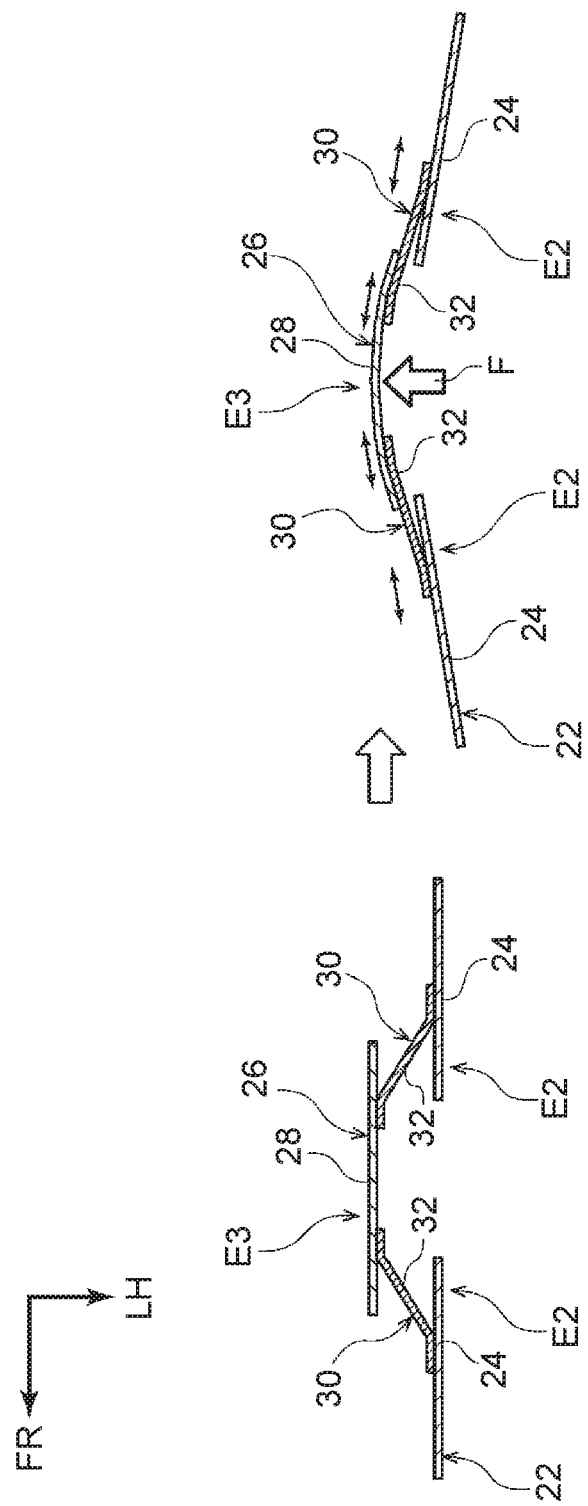
FIG. 5 is an explanatory view showing a deformation state at a time of a side collision of the rocker configuring the vehicle body side structure according to the first embodiment, with a focus on only a high-strength region.

As described above, the second region E2 and the third region E3 both configured as the high-strength regions are connected by the connecting members 30 having the respective inclined walls 32. Therefore, at a time of a side collision of the vehicle 12, a collision load F (see FIG. 5) is input into the first region E1 of the rocker 20 from the outer side in the vehicle width direction. The region where this input collision load F is transmitted (load transmission path), as shown in FIG. 5, is formed by the second region E2, the connecting members 30, and the third region E3 (in this order).

More specifically, when the collision load F is input from the outer side in the vehicle width direction and the rocker 20 is thus deformed inward in the vehicle width direction, the first region E1 as the low-strength region serves a compression deformation side, and the second region E2 and the third region E3 as the high-strength regions, and the connecting members 30 serve as a tensile deformation side. Accordingly, the collision load F can be effectively transmitted (absorbed) by the second region E2 and the third region E3 having a high strength, and the connecting member 30 serve as the tensile deformation side.

That is, the energy absorption efficiency of the rocker 20 with respect to the collision load F input from the outer side in the vehicle width direction can be increased. Accordingly, the collision safety performance at the time of the side collision of the vehicle 12 can be enhanced. Specifically, at the time of the side collision of the vehicle 12, buckling deformation toward the inner side in the vehicle width direction of the rocker 20, which narrows the vehicle cabin space, can be restrained, to thereby secure the safety of an occupant.

In addition, if the third region E3 has a strength equal to or more than that of the second region E2 (the plate thickness of the third region E3 is set to be equal to or more than the plate thickness of the second region E2), the collision load F input into the rocker 20 from the outer side in the vehicle width direction can be efficiently absorbed by the third region E3 on the tensile deformation side. Accordingly, enhancement of the energy absorption efficiency of the rocker 20 with respect to the collision load F input from the outer side in the vehicle width direction can be further promoted.

The same applies to the case in which the second region E2 has a strength equal to or more than that of the third region E3 (the plate thickness of the second region E2 is set to be equal to or more than the plate thickness of the third region E3). That is, in this case, the collision load F input into the rocker 20 from the outer side in the vehicle width direction can be efficiently absorbed by the second region E2 on the tensile deformation side and can also be transmitted to the third region E3 on the tensile deformation side at the same time.

The length of the third region E3 along the front-rear direction of the vehicle body is set to be longer than the length of the first region E1 along the front-rear direction of the vehicle body. Accordingly, the collision load F input into the rocker 20 from the outer side in the vehicle width direction can be more smoothly transmitted from the second region E2 to the third region E3, compared with a case in which the length of the third region E3 along the front-rear direction of the vehicle body is set to be shorter than the length of the first region E1 along the front-rear direction of the vehicle body. Accordingly, the energy absorption efficiency of the rocker 20 with respect to the collision load F input from the outer side in the vehicle width direction can be further increased.

The front part and the rear part of the third region E3 overlap respectively with the second region E2 on the front side and the second region E2 on the rear side in the front-rear direction of the vehicle body, in a side view as viewed from the vehicle width direction. Therefore, compared with a configuration in which the third region E3 does not overlap with the second region E2 in the front-rear direction of the vehicle body and a configuration in which only the front part or the rear part of the third region E3 overlaps with the second region E2 in the front-rear direction of the vehicle body, it is possible to more smoothly form the region on the tensile deformation side (load transmission path) that transmits the collision load F input into the rocker 20 from the outer side in the vehicle width direction.

That is, as shown in FIG. 5, as the front part and the rear part of the third region E3 after being deformed overlap respectively with the second region E2 on the front side and the second region E2 on the rear side after being deformed in the front-rear direction of the vehicle body, even without the connecting members 30 (inclined walls 32) between the second region E2 and the third region E3, the high-strength region is not discontinued in the front-rear direction of the vehicle body from the second region E2 to the third region E3. Therefore, the collision load F input from the outer side in the vehicle width direction can be transmitted directly and smoothly from the second region E2 to the third region E3, to thereby further increase the energy absorption efficiency of the rocker 20 with respect to the collision load F.

The upper flange portion 23A and the upper flange portion 27A in the overlapping region are provided with spot-welded portions P, and the lower flange portion 25A and the lower flange portion 29A in the overlapping region are also provided with spot-welded portions (not shown). Therefore, the collision load F can be transmitted not only by the connecting members 30 but also by the upper flange portions 23A, 27A as well as the lower flange portions 25A, 29A.

A load is likely to concentrate on the spot-welded portions P on the upper side and the spot-welded portions (not shown) on the lower side that are provided in the overlapping regions, so that these portions (regions) are likely to be broken and discontinued; however, at least parts of the connecting members 30 (inclined walls 32) are provided in the overlapping regions. Therefore, it is possible to prevent these portions (regions) from being broken and discontinued. Accordingly, the collision load F input into the rocker 20 from the outer side in the vehicle width direction can be efficiently transmitted from the second region E2 to the third region E3.

The heights of the connecting members 30 are set to be the same as the heights of the respective side walls 24, 28 of the outer panel 22 and the inner panel 26. Therefore, compared with a case in which the heights of the connecting members 30 are formed to be lower than the heights of the respective side walls 24, 28 of the outer panel 22 and the inner panel 26, the region on the tensile deformation side (load transmission path) for transmitting the collision load F input into the rocker 20 from the outer side in the vehicle width direction is effectively formed by using the entire heights of the respective side walls 24, 28 of the outer panel 22 and the inner panel 26. Accordingly, the collision load F can be efficiently transmitted from the side wall 24 of the outer panel 22 to the side wall 28 of the inner panel 26.

As described above, in the present embodiment, the high-strength region serving as the tensile deformation side is formed by partially increasing the plate thickness of the outer panel 22 and the plate thickness of the inner panel 26. Therefore, compared with a configuration in which a reinforcing member is separately joined to the outer panel 22 and the inner panel 26 so as to form a high-strength region, this joining process can be eliminated, and thus the manufacturing cost can be reduced.

In the inner panel 26, the plate thickness of the fourth region E4 is thinner than the plate thickness of the third region E3. Therefore, in the rocker 20, the fourth region E4 to which the collision load F is not directly transmitted is implemented by a simple structure of reducing the plate thickness, and the weight reduction is attained as well. Accordingly, the vehicle 12 can be reduced in weight while enhancing the energy absorption efficiency of the rocker 20 with respect to the collision load F input from the outer side in the vehicle width direction.

Similarly, in the outer panel 22, the plate thickness of the first region E1 is thinner than the plate thickness of the second region E2. Accordingly, in the rocker 20, the first region E1 on the compression deformation side is implemented by a simple structure of reducing the plate thickness, and the weight reduction is attained as well. Accordingly, the vehicle 12 can be reduced in weight while enhancing the energy absorption efficiency of the rocker 20 with respect to the collision load F input from the outer side in the vehicle width direction.

Second Embodiment

Next, the second embodiment will be described. Note that components and parts equivalent to those in the first embodiment will be denoted by the same reference numerals and detailed description thereof (including the common operation) will be appropriately omitted.

Figure 6:
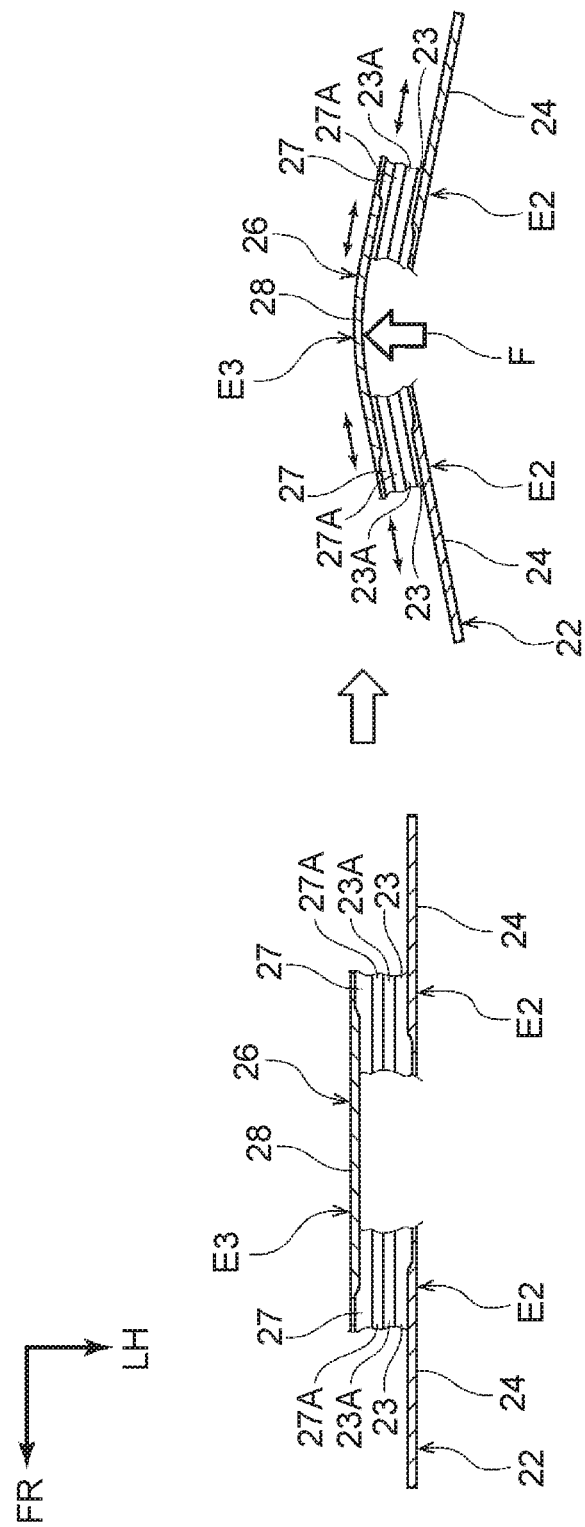
FIG. 6 is an explanatory view showing a deformation state at the time of the side collision of a rocker configuring a vehicle body side structure according to a second embodiment, with a focus on only a high-strength region.

As shown in FIG. 6, the vehicle body side structure 10 according to the second embodiment is different from the first embodiment only in that the connecting members 30 are omitted. In FIG. 6, the side wall 24 in the second region E2 that is the high-strength region and the side wall 28 in the third region E3 that is the high-strength region are respectively shown in a plan sectional view, and the upper wall 23 and the upper wall 27, and the upper flange portion 23A and the upper flange portion 27A are respectively shown in a plan view. That is, this view is a sectional view of the rocker 20 horizontally taken along the vehicle front-rear direction and as viewed from below.

Thus, even if the connecting members 30 are omitted, the collision load F can be effectively transmitted (absorbed) by the second region E2 and the third region E3 that are the high-strength regions on the tensile deformation side. More specifically, at the time of the side collision of the vehicle 12, the collision load F is input into the first region E1 of the rocker 20 from the outer side in the vehicle width direction; and due to this input of the collision load F, the upper wall 23 and the lower wall 25 of the outer panel 22, and the upper wall 27 and the lower wall 29 of the inner panel 26 are collapsed in such a manner as to protrude upward and downward, respectively.

As described above, the collision load F can be transmitted by the upper flange portions 23A, 27A and the lower flange portions 25A, 29A in the overlapping region. Therefore, the region (load transmission path) to which the input collision load F is transmitted is formed by the second region E2 also including the collapsed upper wall 23 and lower wall 25, and the third region E3 also including the collapsed upper wall 27 and lower wall 29.

Accordingly, the collision load F can be effectively transmitted (absorbed) by the second region E2 and the third region E3 each having a high strength and serving as the tensile deformation side. That is, it is possible to enhance the energy absorption efficiency of the rocker 20 with respect to the collision load F input from the outer side in the vehicle width direction, to thereby promote enhancement of the collision safety performance at the time of the side collision of the vehicle 12.

Third Embodiment

Finally, the third embodiment will be described. Note that components and parts equivalent to those in the first embodiment will be denoted by the same reference numerals and detailed description thereof (including the common operation) will be appropriately omitted.

As shown in FIG. 7, in the vehicle body side structure 10 according to the third embodiment, the length in the front-rear direction of a joint part 17 which is the lower end portion of a B pillar 15 is shorter than the length of the joint part 16 of the B pillar 14 in the first embodiment. An aperture 21 into which the joint part 17 can be inserted is formed continuously in the vehicle width direction by a part of the upper wall 23 (including the upper flange portion 23A) of the outer panel 22 and a part of the upper wall 27 (including the upper flange portion 27A) of the inner panel 26.

That is, the vehicle body side structure 10 according to the third embodiment is different from the first embodiment in that the joint part 17 of the B pillar 15 is inserted into the aperture 21, and a wall surface of the joint part 17 facing outward in the vehicle width direction is overlaid on and welded by joining methods, such as spot welding, to the inner surface in the closed cross-section of the side wall 24 of the outer panel 22, and the wall surface of the joint part 17 facing inward in the vehicle width direction is overlaid on and welded by joining methods such as spot welding to the inner surface in the closed cross-section of the side wall 28 of the inner panel 26.

In such a configuration, the collision load F is transmitted as follows. That is, at the time of the side collision of the vehicle 12, the collision load F is directly input from the joint part 17 of the B pillar 15 into the third region E3 of the rocker 20. Therefore, the region (load transmission path) to which the input collision load F is transmitted is formed by the third region E3, the connecting members 30, and the second region E2 (in this order).

Therefore, the collision load F can be effectively transmitted (absorbed) by the second region E2 and third region E3 that have a high strength and serve as the tensile deformation side, together with the connecting member 30. That is, the energy absorption efficiency of the rocker 20 with respect to the collision load F input from the outer side in the vehicle width direction can be increased, and thus the collision safety performance at the time of the side collision of the vehicle 12 can be enhanced.

In the third embodiment, the joint part 17 of the B pillar 15 inserted into the aperture 21 is joined only to the inner surface in the closed cross-section of the side wall 24 of the outer panel 22 or only to the inner surface in the closed cross-section of the side wall 28 of the inner panel 26 by joining methods such as spot welding.

As described above, the vehicle body side structure 10 according to the present embodiment has been described based on the drawing. However, the vehicle body side structure 10 according to the present embodiment is not limited to the illustrated one, and can be designed and changed as appropriate without departing from the scope of the present disclosure. For example, the joining methods is not limited to spot welding, and may be laser welding or the like.

Moreover, the pillar according to the present embodiment may have any configuration as far as the lower end portion of the pillar can be arranged to be overlaid on the rocker 20 extending in the front-back direction of the vehicle body, and this pillar is not limited to the B pillar 14 or the B pillar 15. Further, the front part and the rear part of the third region E3 may be configured not to overlap respectively with the second region E2. Further, only the front part or only the rear part of the third region E3 may be configured to overlap with the second region E2.

In the second region E2 and the third region E3, only the plate thicknesses of the side walls 24, 28 may be thicker. That is, in the second region E2 and the third region E3, the plate thicknesses of the upper walls 23, 27 and the lower walls 25, 29, and the upper flange portions 23A, 27A and the lower flange portions 25A, 29A may not be thicker.

Similarly, in the first region E1 and the fourth region E4, only the plate thicknesses of the side walls 24, 28 may be thinner. That is, in the first region E1 and the fourth region E4, the plate thicknesses of the upper walls 23, 27 and the lower walls 25, 29, and the upper flange portions 23A, 27A and the lower flange portions 25A, 29A may not be thinner.

The method of changing the strengths of the outer panel 22 and the inner panel 26 is not limited to the method of partially changing the plate thicknesses thereof, and a method of partially changing materials or material qualities thereof may also be employed. For example, in a hot stamping method, the high-strength region is subjected to quenching and the low-strength region is not subjected to the quenching such that a difference in strength is created between these regions.

The strength in the second region E2 on the front side and the strength in the second region E2 on the rear side are unnecessary to be the same, and the strength in the second region E2 on the front side and the strength in the second region E2 on the rear side may be different from each other. Similarly, the strength in the fourth region E4 on the front side and the strength in the fourth region E4 on the rear side are unnecessary to be the same, and the strength in the fourth region E4 on the front side and the strength in the fourth region E4 on the rear side may be different from each other.

What is claimed is:

1. A vehicle body side structure comprising:
   a rocker formed in a closed cross-sectional shape by joining an outer panel disposed outward in a vehicle width direction and extending in a front-rear direction of a vehicle body, and an inner panel disposed inward in the vehicle width direction and extending in the front-rear direction of the vehicle body; and
   a pillar having a lower end portion joined to the rocker, wherein
   the outer panel includes a first region overlapping with the lower end portion of the pillar in a side view as viewed from the vehicle width direction, and a second region adjacent to the first region on a front side of the vehicle body and on a rear side of the vehicle body,
   the inner panel includes a third region including a part facing the first region in the vehicle width direction, and a fourth region adjacent to the third region on the front side of the vehicle body and on the rear side of the vehicle body, the second region is set to be a first-strength region having a higher strength than a strength of the first region, and the third region is set to be a second-strength region having a higher strength than a strength of the fourth region, and the second region and the third region are connected to each other.

2. The vehicle body side structure according to claim 1, wherein the third region is longer in the front-rear direction of the vehicle body than the first region.

3. The vehicle body side structure according to claim 2, wherein in the side view as viewed from the vehicle width direction, a front part and a rear part of the third region overlap respectively with the second region in the front-rear direction of the vehicle body.

4. The vehicle body side structure according to claim 1, further comprising a connecting member connecting the second region and the third region, wherein the connecting member has an inclined wall inclining with respect to the front-rear direction of the vehicle body, in a plan view as viewed from above the vehicle body.

5. The vehicle body side structure according to claim 3, further comprising a connecting member connecting the second region and the third region, wherein the connecting member has an inclined wall inclining with respect to the front-rear direction of the vehicle body in a plan view as viewed from above the vehicle body, and at least a part of the connecting member is disposed in a region where the second region and the third region overlap with each other.

6. The vehicle body side structure according to claim 4, wherein a height of the connecting member is the same as a height of each of side walls of the outer panel and the inner panel.

7. The vehicle body side structure according to claim 1, wherein a plate thickness of the fourth region is thinner than a plate thickness of the third region.

8. The vehicle body side structure according to claim 1, wherein a plate thickness of the first region is thinner than a plate thickness of the second region.

9. The vehicle body side structure according to claim 1, wherein a strength of the third region is equal to or more than a strength of the second region.

* * * * *